United States Patent
Noguchi

(10) Patent No.: US 7,631,345 B2
(45) Date of Patent: Dec. 8, 2009

(54) RELAY DEVICE, AUTHENTICATION SERVER, AND AUTHENTICATION METHOD

(75) Inventor: Katsuhiro Noguchi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 663 days.

(21) Appl. No.: 11/219,739

(22) Filed: Sep. 7, 2005

(65) Prior Publication Data

US 2006/0053300 A1 Mar. 9, 2006

(30) Foreign Application Priority Data

Sep. 7, 2004 (JP) ............................ P2004-260196

(51) Int. Cl.
*H04L 9/32* (2006.01)
(52) U.S. Cl. ..................... 726/2; 726/3; 726/4
(58) Field of Classification Search ................ 713/168, 713/170; 726/2–4, 11, 14–15
See application file for complete search history.

(56) References Cited

U.S. PATENT DOCUMENTS

| 5,671,354 | A | * | 9/1997 | Ito et al. .......................... 726/3 |
| 6,003,084 | A | * | 12/1999 | Green et al. ................. 709/227 |
| 2003/0217285 | A1 | | 11/2003 | Sanchez Herrero et al. |
| 2004/0025056 | A1 | | 2/2004 | Katsube |

FOREIGN PATENT DOCUMENTS

WO   WO 99/27678   6/1999

OTHER PUBLICATIONS

Atsushi Inoue, et al., "Ip Layer Security And Mobility Support Design Policy And An Implementation", XVI World Telecom Congress Proceedings, Interactive Session 2-System Architecture, vol. vol. 1, XP-000720565, Sep. 21, 1997, pp. 571-577.
"An Introduction to Cryptography," Newtork Associates, Inc., 1990, pp. 1-88.
Imyoung-Leem, et al. "Information Protection in Communication Network," 1996, pp. 96-98, (with English Translation).
B. Aboba, et al., "Radius (Remote Authentication Dial In User Service) Support for Extensible Authentication Protocol (EAP)", Microsoft, XP015009361, Sep. 2003, pp. 1-46.

* cited by examiner

*Primary Examiner*—Hosuk Song
(74) *Attorney, Agent, or Firm*—Oblon, Spivak, McClelland, Maier & Neustadt, L.L.P.

(57) ABSTRACT

A relay device includes a security information reception unit, a security information processing unit, and a security information transmission unit. The security information reception unit receives, from a terminal device, first security information containing a user ID and user authentication information of a user of the terminal device. The security information processing unit adds a relay device ID and relay device authentication information to the first security information to generate second security information. The security information transmission unit transmits the second security information to an authentication server.

6 Claims, 5 Drawing Sheets

100 TERMINAL DEVICE

200 RELAY DEVICE

300 AUTHENTICATION SERVER

100 TERMINAL DEVICE
200 RELAY DEVICE
300 AUTHENTICATION SERVER

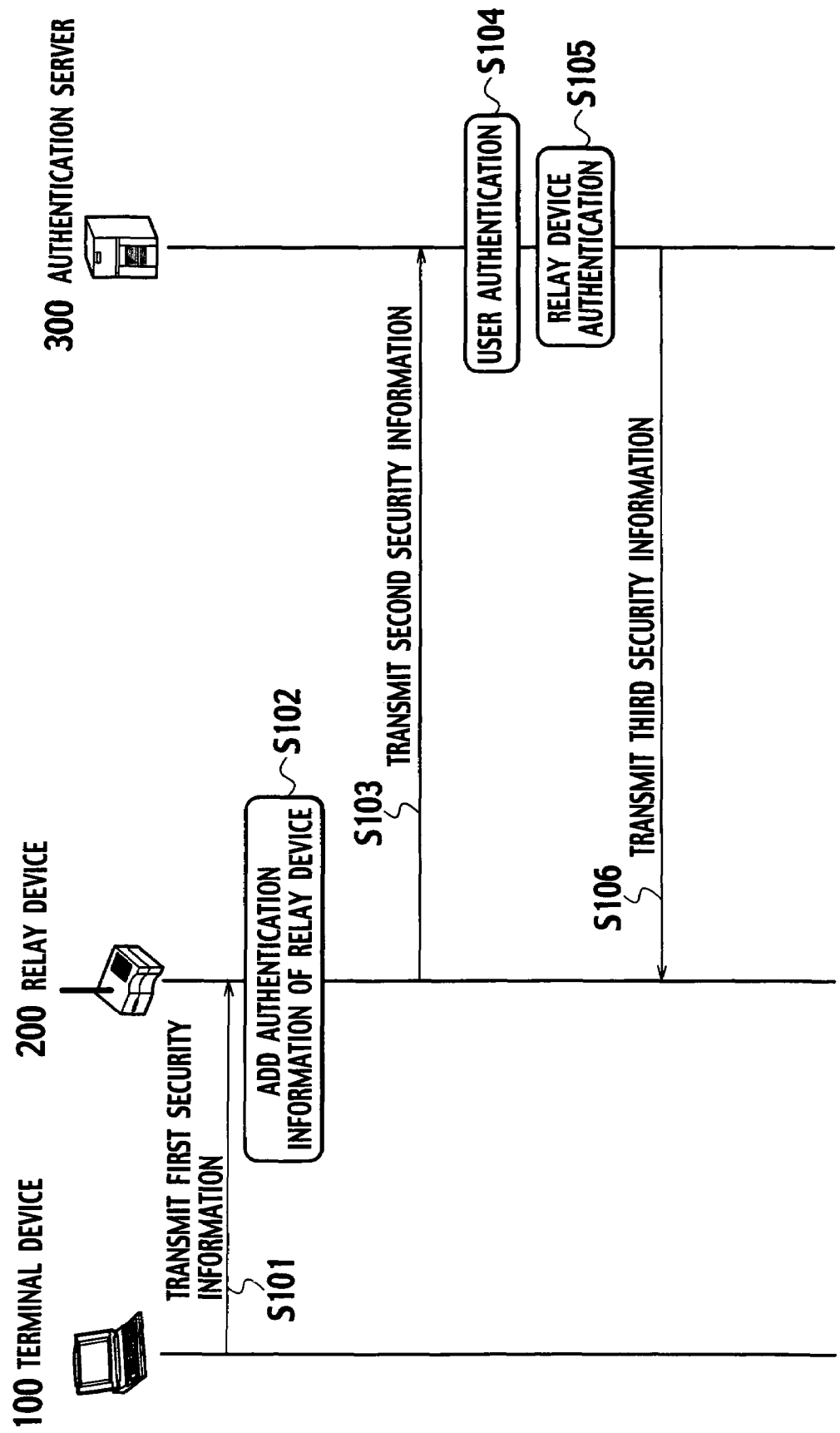

RELAY DEVICE, AUTHENTICATION SERVER, AND AUTHENTICATION METHOD

CROSS REFERENCE TO RELATED APPLICATIONS

This application is based upon and claims the benefit of priority from prior Japanese Patent Application P2004-260196 filed on Sep. 7, 2004; the entire contents of which are incorporated by reference herein.

BACKGROUND OF THE INVENTION

1. Field of the Invention

The present invention relates to a relay device, an authentication server, and an authentication method.

2. Description of the Related Art

Conventionally, when a relay device is controlled by a provider, an authentication server has notified security information necessary for keeping data secret, securing data integrity, or the like to the relay device controlled by the provider (referred to as "provider-controlled relay device", hereinafter). Accordingly, data has been kept secret and data integrity has been secured between a terminal device and the provider-controlled device. FIG. 1 shows that a secure communication path is established between a terminal device 100 and a provider-controlled relay device 200a.

Additionally, it can be imagined that not only the provider-controlled relay device but also a relay device not controlled by the provider (referred to as provider-uncontrolled relay devices, hereinafter) will have to be accommodated (e.g., H. Yumida, et al, "IP-Based IMT Network Platform", IEEE Personal Communication Magazine, October 2001, pp. 18 to 23). As the provider-uncontrolled relay device, for example, an access point set at user's home or office may be cited. Thus, in the case of accommodating such a provider-uncontrolled relay device, data must be kept secret and data integrity must be secured between the terminal device and the authentication server. FIG. 1 shows that a secure communication path is established among the terminal device 100, a provider-uncontrolled relay device 200b, and an authentication server 300.

However, the provider-uncontrolled relay device may disguise itself as a provider-controlled relay device by using an ID of the provider-controlled relay device to bug or falsify data, creating a danger of invading user's privacy. FIG. 2 shows that the provider-uncontrolled relay device 200b disguises itself as the provider-controlled relay device 200a by using an ID (ID#1) thereof.

The present invention has been developed with the foregoing problem in mind, and objects of the invention are to provide a relay device capable of preventing a danger that a provider-uncontrolled relay device will disguise itself as a provider-controlled relay device to bug or falsify data, thereby invading user's privacy, an authentication server, and an authentication method.

SUMMARY OF THE INVENTION

A first aspect of the present invention is to provide a relay device including: (A) a first security information reception unit configured to receive, from a terminal device, first security information containing a user ID and user authentication information of a user of the terminal device; (B) a security information processing unit configured to add a relay device ID and relay device authentication information to the first security information to generate second security information; and (C) a security information transmission unit configured to transmit the second security information to an authentication server.

A second aspect of the present invention is to provide an authentication server that executes user authentication processing for a user of a terminal device and relay device authentication processing for a relay device, including: (A) a user authentication processing unit configured to execute user authentication processing to determine whether the user of the terminal device is a legitimate user or not based on second security information containing a user ID and user authentication information of the user and a relay device ID and relay device authentication information of the relay device received from the relay device; and (B) a relay device authentication processing unit configured to execute relay device authentication processing to determine whether the relay device is a legitimate relay device or not based on the second security information.

A third aspect of the present invention is to provide an authentication method that executes user authentication processing for a user of a terminal device and relay device authentication processing for a relay device, including: (A) by the terminal device, transmitting first security information containing a user ID and user authentication information of the user to the relay device; (B) by the relay device, adding a relay device ID and relay device authentication information of the relay device to the first security information to generate second security information; (C) by the relay device, transmitting the second security information to an authentication server; (D) by the authentication server, executing user authentication processing to determine whether the user of the terminal device is a legitimate user or not based on the second security information; and (E) by the authentication server, executing relay device authentication processing to determine whether the relay device is a legitimate relay device or not based on the second security information.

BRIEF DESCRIPTION OF THE DRAWINGS

FIG. 7 is a flowchart showing an authentication method according to the embodiment of the present invention.

DETAILED DESCRIPTION OF THE INVENTION

Figure 1:
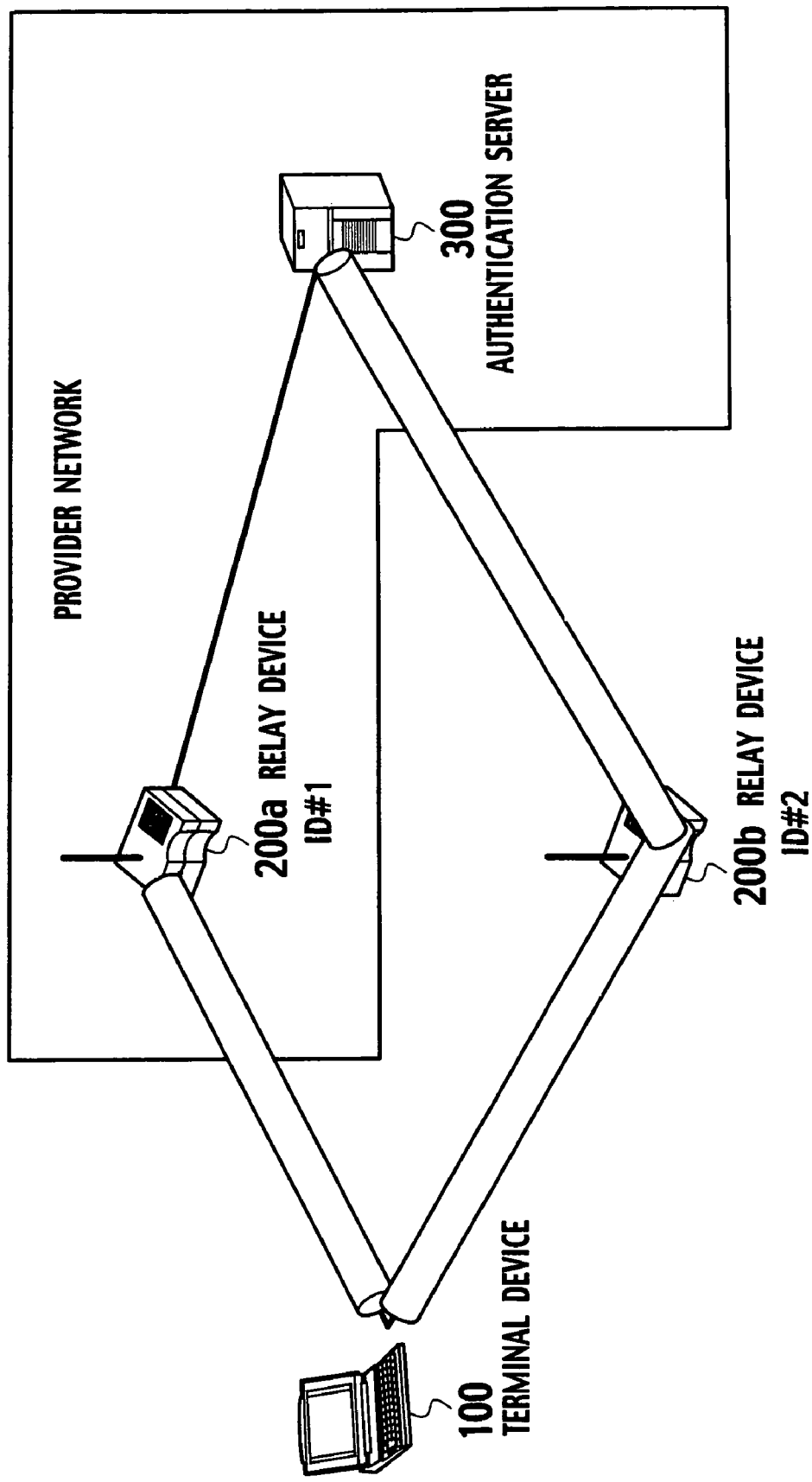
FIG. 1 is a block diagram showing a configuration of a conventional authentication system (No. 1).
Figure 2:
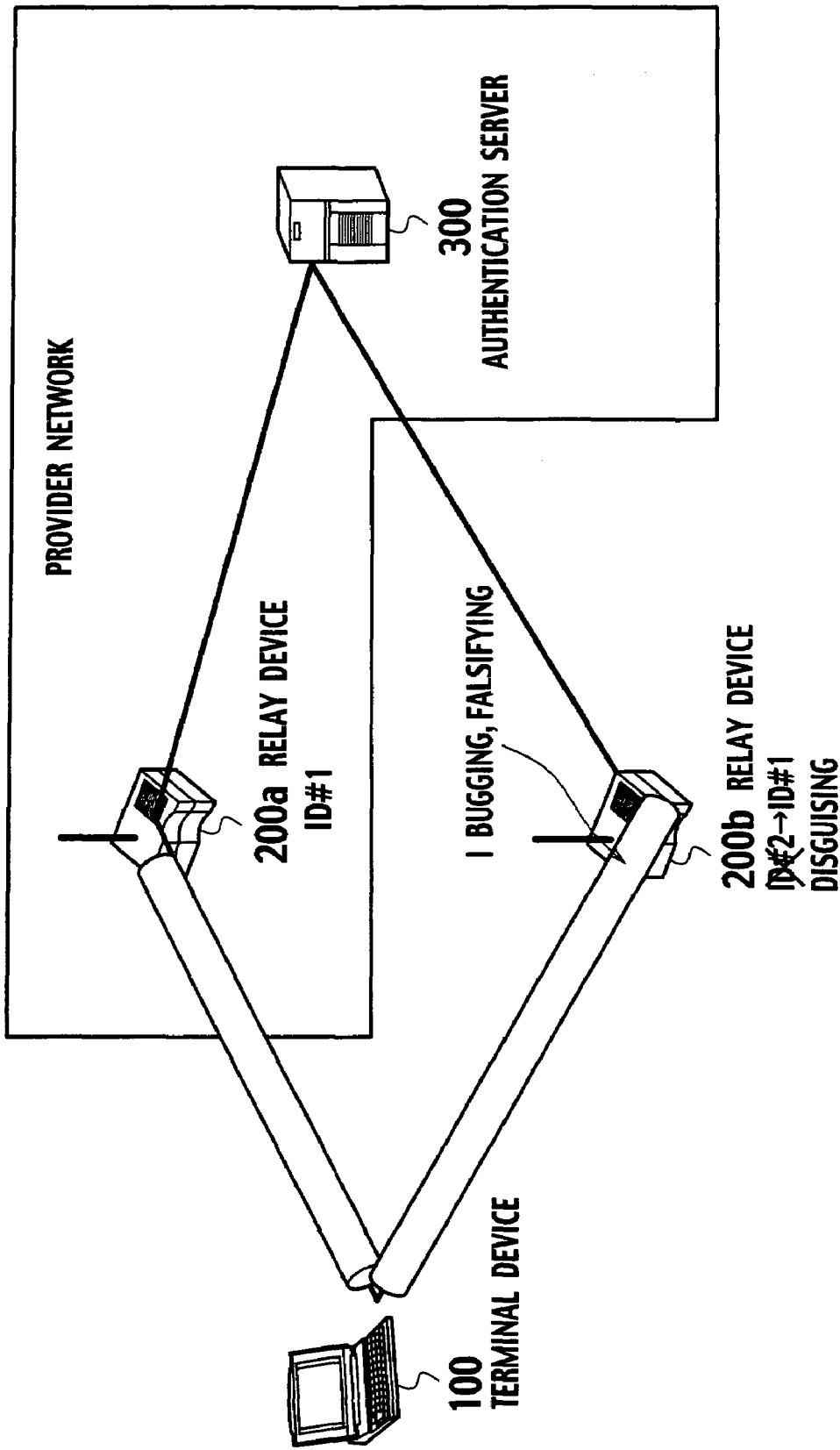
FIG. 2 is a block diagram showing the configuration of the conventional authentication system (No. 2).

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

(Authentication System)

Figure 3:
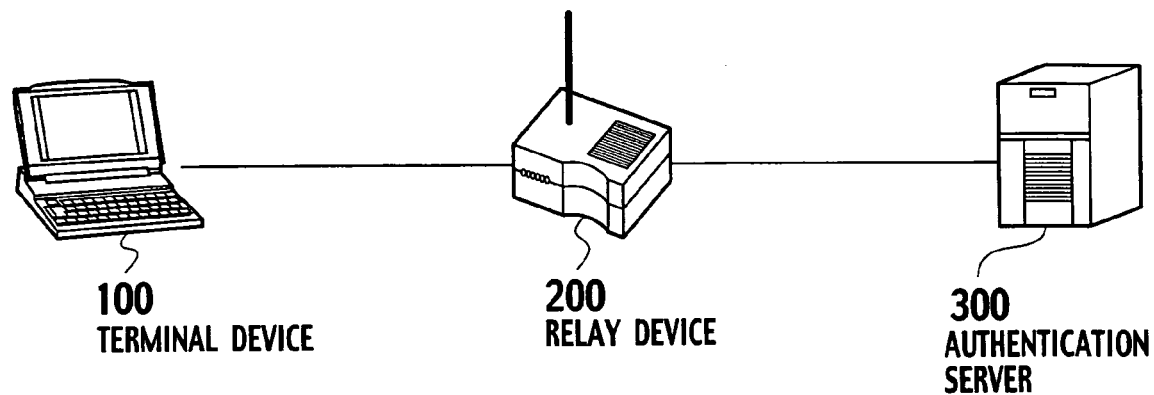
FIG. 3 is a block diagram showing a configuration of an authentication system according to an embodiment of the present invention.

Referring to FIG. 3, an authentication system of an embodiment includes a terminal device 100, a relay device 200, and an authentication server 300.

The authentication server 300 executes user authentication processing for a user of the terminal device 100. The authentication server 300 also executes relay device authentication processing for a relay device ID of the relay device 200.

In the authentication system of the embodiment, the terminal device 100 is connected to the relay device 200 by radio, and the relay device 200 is connected to the authentication server 300.

Figure 4:
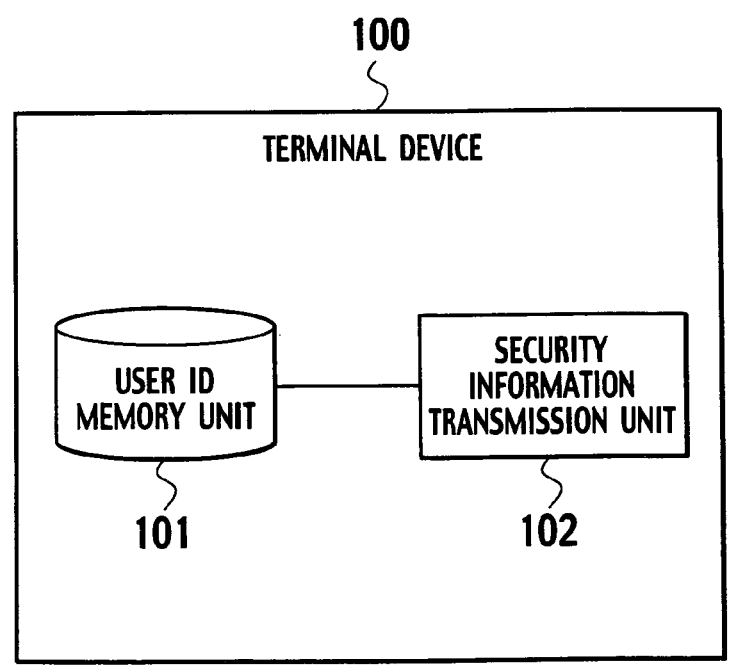
FIG. 4 is a block diagram showing a configuration of a terminal device according to the embodiment of the present invention.

Referring to FIG. 4, the terminal device 100 includes a user ID memory unit 101, and a security information transmission unit 102. As the terminal device 100, for example, a portable communication terminal or the like is used.

The user ID memory unit 101 stores a user ID to identify the user of the terminal device 100, and user authentication information necessary for user authentication. For example, as the user ID, a portable telephone number or the like is used. As the user authentication information, a digital signature, a password, or the like is used.

The security information transmission unit 102 transmits first security information containing the user ID and the user authentication information to the relay device 200 during the user authentication processing.

Figure 5:
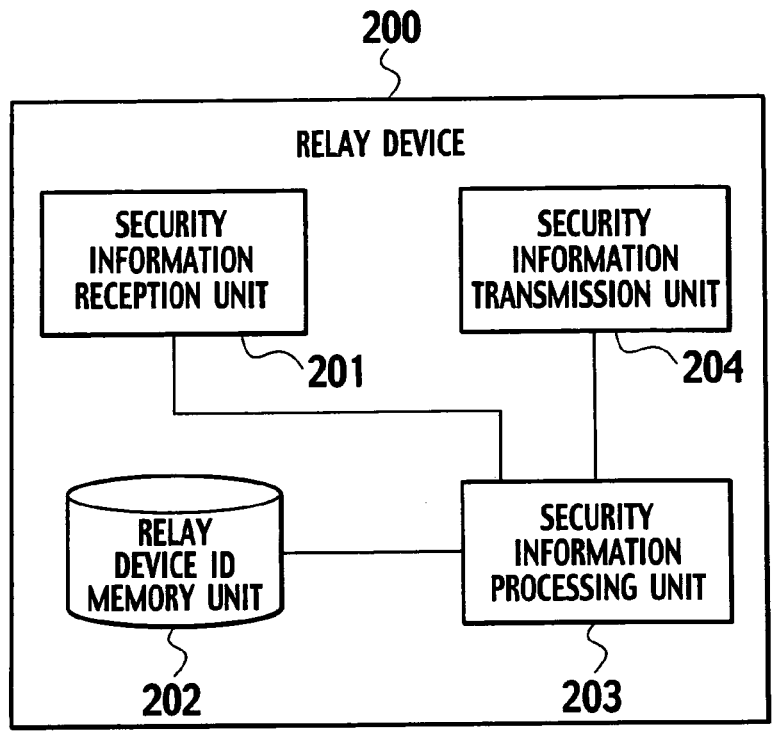
FIG. 5 is a block diagram showing a configuration of a relay device according to the embodiment of the present invention.

Referring to FIG. 5, the relay device 200 includes a security information reception unit 201 (a first security information reception unit and a second security information reception unit), a relay device ID memory unit 202, a security information processing unit 203, and a security information transmission unit 204. As the relay device 200, for example, a radio access point or the like is used.

The security information reception unit 201 receives the first security information from the terminal device 100. Additionally, the security information reception unit 201 receives, from the authentication server 300, third security information which is generated based on second security information (described later) and necessary for keeping secret data of the user of the terminal device 100 and securing integrity thereof.

The relay device ID memory unit 202 stores the relay device ID and relay device authentication information necessary for authenticating the relay device. For example, as the relay device ID, an IP address or the like is used. As the relay device authentication information, a digital signature, a password, or the like is used.

The security information processing unit 203 adds the relay device ID and the relay device authentication information to the first security information to generate the second security information. In other words, the second security information contains the user ID, the user authentication information, the relay device ID, and the relay device authentication information.

The security information transmission unit 204 transmits the second security information to the authentication server 300.

Figure 6:
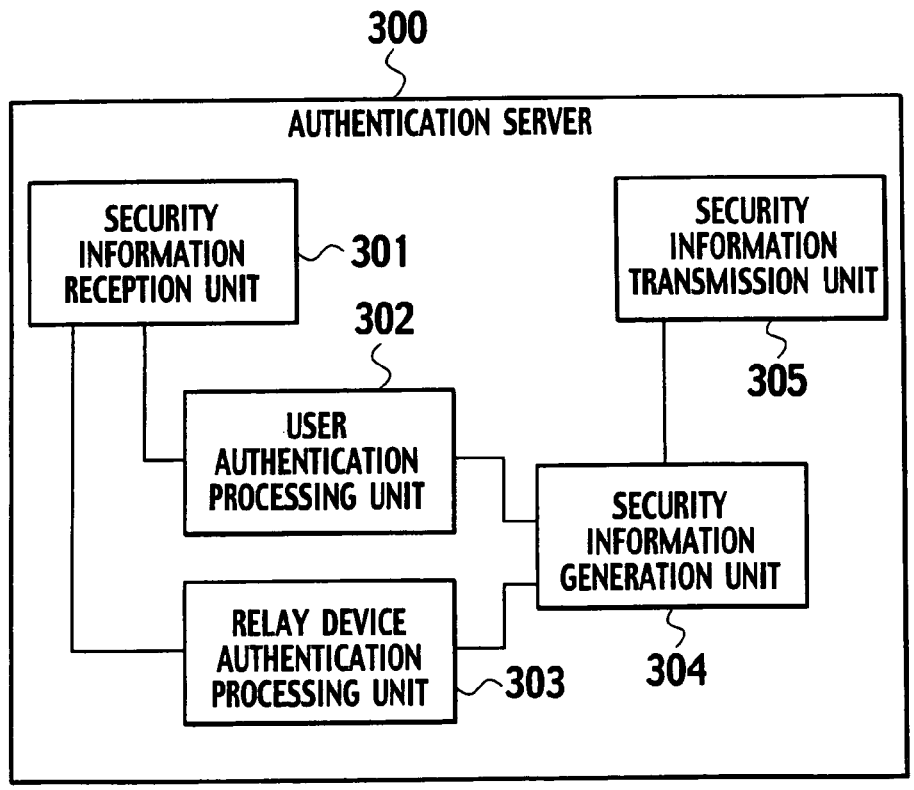
FIG. 6 is a block diagram showing a configuration of an authentication server according to the embodiment of the present invention.

Referring to FIG. 6, the authentication sever 300 includes a security information reception unit 301, a user authentication processing unit 302, a relay device authentication processing unit 303, a security information generation unit 304, and a security information transmission unit 305. As the authentication server 300, for example, an application authorization accounting (AAA) server or the like is used.

The security information reception unit 301 receives the second security information from the relay device 200.

The user authentication processing unit 302 authenticates whether the user is a legitimate user or not based on the user ID and the user authentication information contained in the second security information.

The relay device authentication processing unit 303 authenticates whether the relay device is a legitimate relay device or not based on the relay device ID and the relay device authentication information contained in the second security information.

The security information generation unit 304 generates the third security information necessary for keeping secret the data of the user and securing integrity thereof from the user ID and the user authentication information contained in the second security information.

The security information transmission unit 305 transmits the third security information to the relay device 200.

It is to be noted that the user ID memory unit 101 of the terminal device 100 and the relay device ID memory unit 202 of the relay device 200 may be internal memories such as RAM, or external memories such as HD or FD.

The authentication server 300 of the embodiment can be configured by comprising a processing control unit (CPU) and incorporating the user authentication processing unit 302, the relay device authentication processing unit 303 or the like as a module in the CPU. Similarly, the relay device 200 can be configured by comprising a processing control unit (CPU) and incorporating the security information processing unit 203 or the like as a module in the CPU. Such a module can be realized by executing a dedicated program for using a predetermined programming language in a general-purpose computer such as a personal computer.

Each of the authentication server 300 and the relay device 200 may comprise a program holding unit (not shown) for storing a program to cause the CPU to execute the user authentication processing, the relay device authentication processing, the security information processing, or the like. For example, the program holding unit is a recording medium such as a RAM, a ROM, a hard disk, a flexible disk, a compact disk, an IC chip, or a cassette tape. According to such a recording medium, the program can be easily stored, transported, or sold.

(Authentication Method)

Next, the authentication method of the embodiment will be described by referring to FIG. 7.

First, in step S101, the terminal device 100 that desires user authentication processing transmits the first security information containing the user ID and the user authentication information to the relay device 200.

Next, in step S102, the relay device 200 adds the relay ID and the relay device authentication information to the first security information to generate the second security information.

Next, in step S103, the relay device 200 transmits the second security information to the authentication server 300.

Next, in step S104, the authentication server 300 executes user authentication processing for the user ID of the terminal device 100 based on the received second security information.

Next, in step S105, the authentication server 300 executes relay device authentication processing for the ID of the relay device 200 based on the received second security information.

Next, when the user authentication and the relay device authentication are successful, the authentication server 300 generates the third security information necessary for keeping the data secret and securing integrity thereof. Then, in step S106, the authentication server 300 transmits the third security information to the relay device 200.

The relay device 200 transmits the third security information to the terminal device 100.

(Operations and Effects)

According to the relay device 200, the authentication server 300, and the authentication method of the embodiment, it is possible to prevent a danger that the provider-uncontrolled relay device disguises itself as a provider-controlled relay device to bug or falsify data, thereby invading user's privacy.

Specifically, the relay device 200 and the terminal device 100 keep the data secret by using the third security information. Thus, it is possible to prevent the provider-uncontrolled relay device from disguising itself as a provider-controlled relay device to bug the data.

Furthermore, the relay device 200 and the terminal device 100 secure data integrity (integrity check) by using the third security information. Thus, it is possible to prevent the provider-uncontrolled relay device from disguising itself as a provider-controlled relay device to falsify the data.

Other Embodiments

The present invention has been described by way of embodiment. It should not be understood, however, that the description and the drawings constituting parts of the disclosure are limitative of the invention. As apparent to those skilled in the art from the disclosure, various alternative embodiments, examples, and operation technologies can be employed.

For example, the embodiment has been described on the presumption that the relay device 200 is a radio access point. However, the relay device 200 may be an access router. For example, to accommodate the provider-uncontrolled relay device, an access router is installed between the provider-uncontrolled relay device and the authentication server 300. Then, the access router keeps the data secret and secures integrity thereof based on the third security information received from the authentication server 300.

Various modifications will become possible for those skilled in the art after receiving the teachings of the present disclosure without departing from the scope thereof.

What is claimed is:

1. A relay device comprising:
   a first security information reception unit configured to receive, from a terminal device, first security information containing a user ID and user authentication information of a user of the terminal device;
   a security information processing unit configured to add a relay device ID and relay device authentication information to the first security information to generate second security information; and
   a security information transmission unit configured to transmit the second security information to an authentication server.

2. A relay device according to claim 1, further comprising a second security information reception unit configured to receive, from the authentication server, third security information generated based on the second security information and necessary for keeping secret data of the user of the terminal device and securing integrity of the data.

3. An authentication server that executes user authentication processing for a user of a terminal device and relay device authentication processing for a relay device, comprising:
   a user authentication processing unit configured to execute user authentication processing to determine whether the user of the terminal device is a legitimate user or not based on second security information containing a user ID and user authentication information of the user and a relay device ID and relay device authentication information of the relay device received from the relay device; and
   a relay device authentication processing unit configured to execute relay device authentication processing to determine whether the relay device is a legitimate relay device or not based on the second security information.

4. An authentication server according to claim 3, further comprising:
   a security information generation unit configured to generate third security information necessary for keeping secret data of the user of the terminal and securing integrity of the data based on the second security information; and
   a security information transmission unit configured to transmit the third security information to the relay device.

5. An authentication method that executes user authentication processing for a user of a terminal device and relay device authentication processing for a relay device, comprising:
   by the terminal device, transmitting first security information containing a user ID and user authentication information of the user to the relay device;
   by the relay device, adding a relay device ID and relay device authentication information of the relay device to the first security information to generate second security information;
   by the relay device, transmitting the second security information to an authentication server;
   by the authentication server, executing user authentication processing to determine whether the user of the terminal device is a legitimate user or not based on the second security information; and
   by the authentication server, executing relay device authentication processing to determine whether the relay device is a legitimate relay device or not based on the second security information.

6. An authentication method according to claim 5, further comprising:
   by the authentication server, generating third security information necessary for keeping secret data of the user of the terminal and securing integrity of the data; and
   by the authentication server, transmitting the third security information to the relay device.

* * * * *